July 10, 1923.

J. W. BROCKSON

TRACTOR

Filed June 8, 1921

1,461,027

WITNESS:
R. P. Kitchel.

INVENTOR
James W. Brockson
BY
Frank S. Busser
ATTORNEY.

Patented July 10, 1923.

1,461,027

UNITED STATES PATENT OFFICE.

JAMES W. BROCKSON, OF MIDDLETOWN, DELAWARE, ASSIGNOR OF ONE-HALF TO P. L. McWHORTER, OF MIDDLETOWN, DELAWARE.

TRACTOR.

Application filed June 8, 1921. Serial No. 475,943.

*To all whom it may concern:*

Be it known that I, JAMES W. BROCKSON, a citizen of the United States, residing at Middletown, county of New Castle and State of Delaware, have invented a new and useful Improvement in Tractors, of which the following is a full, clear, and exact description, reference being had to the accompanying drawings, which form a part of this specification.

My invention relates to an improvement in tractors for use in agriculture, more specifically those for drawing plows or similar implements where it is required to guide the tractor in a parallel line beside an open furrow.

At present it is usual to guide the plows by running with one of the forward supporting wheels in the last furrow. There are various ways of guiding the tractor and all open to objections which are entirely overcome by my invention. Sometimes the tractor is run with both its wheels on that side running in the last furrow, a means of guiding which is obviously bad, tipping the tractor to one side as it does and running the heavy rear tractor wheel in the soft freshly turned earth. Another guiding means now in use consists of a forwardly projecting arm which carries a small wheel traveling ahead of the tractor in the last furrow. This requires considerable power to propel, is constantly becoming stuck into and clogged up with earth, so the operator often draws it up out of action and guides his tractor by eye alone.

My invention consists in an extension to the front axle of the tractor adapted to be readily attached on the right hand or plowing side. The forward wheel on this side is mounted on this extension, which not only projects it about fourteen inches outside the regular wheel base, or enough to run it in the furrow while the remaining wheels are following parallel lines on the unbroken ground, but also carries the wheel at a lower level, thereby allowing the tractor to run level while still having this forward guiding wheel running in the bottom of the last furrow.

The extension piece for the axle is made to conform to the turning knuckles of standard makes of tractors, so the wheel may be mounted on it quickly and with its own king-pin. Other advantages of this construction will be readily appreciated by those skilled in the art.

I will now proceed with a detailed description of my invention in connection with the accompanying drawings, in which—

The tractor $a$ is shown as mounted upon rear wheels $b$ and front wheels $c$ and $d$ and is provided with the usual draw-bar $e$ for connecting with a gang of plows or other implements it is to pull.

Front wheels $c$ and $d$ are mounted on front axle $f$ which is carried by the frame of the tractor in the usual manner. Knuckles $g$ and $h$ are provided with arms $i$ and $j$ which are connected together by the usual tie-rod $k$.

Figure 1:
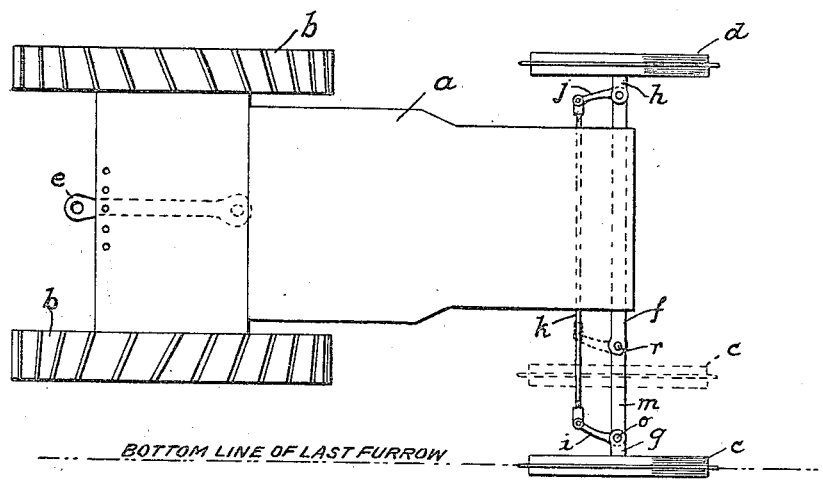
Fig. 1 represents, in plan, a tractor embodying my invention.
Figures 2, 5:
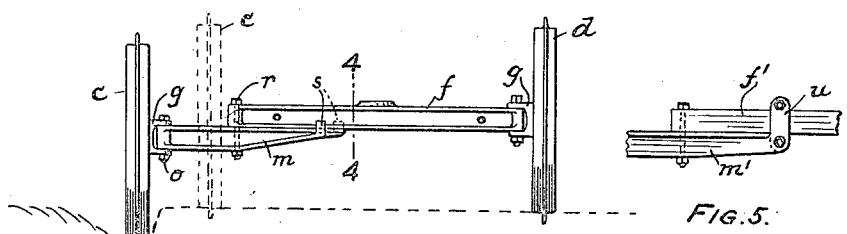
Fig. 2 is an elevation of the front axle and wheels.
Fig. 5 is a fragmentary view showing a modified form of attachment.

In Figs. 1 and 2, wheel $c$ is shown in broken lines in its normal position on the tractor.

$m$ represents an extension piece for the axle having its outer end and hole $n$ similar to the end of axle $f$, so that it will fit knuckle $g$ and king bolt $o$ of wheel $c$. The extension is adapted to fit beneath the end of axle $f$ and is provided midway with a hole $p$ in alignment with the old hole of king bolt $o$ in the axle. A bolt $r$ passes through these aligned holes and holds the parts firmly together. To prevent turning about this bolt, the inner end of the extension is provided with means for gripping the axle.

Figure 3:
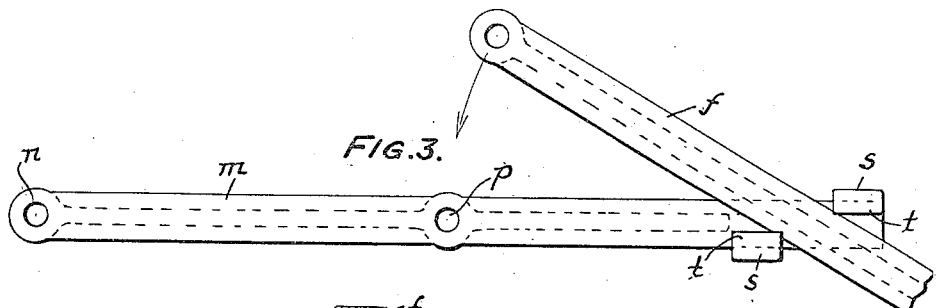
Fig. 3 is an enlarged view showing in plan a detail of construction.
Figure 4:
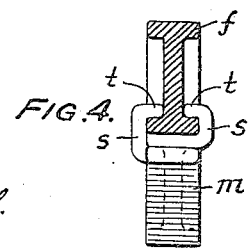
Fig. 4 is an enlarged sectional view on line 4—4 of Fig. 2.

As shown in Figs. 2, 3 and 4, the extension is provided with two ears $s$, one adapted to fit on either side of axle $f$, with overhangs $t$ which engage the flanges of the axle and together with bolt $r$ hold the extension firmly and immovably clamped to the axle. This form of attachment is preferable when the axle is of the I section shown, as it is so readily manipulated and there are no small parts to become broken or lost. Other forms of attachment may be used, however, as that shown in Figure 5, where the axle is not of a form to coact with ears *s*. Here the extension *m′* carries a clamp *u* by which it is secured to the axle *f′*.

The tie-rod *k* is lengthened to suit the greater distance between wheels *c* and *d* either by screwing on an extension or by simply replacing it with a longer rod as shown in Figure 1.

It will be seen that the greater part of the weight of the front portion of the tractor will be carried by wheel *d*. This tends to lead the tractor toward the left, away from the furrow, and this tendency holds wheel *c* more accurately to its line of travel in the bottom of the furrow against the more precipitous side thereof.

The thickness of the axle, vertically, is such that with the extension attached beneath it as described, wheel *c* is lowered some four or five inches, which is practically the depth of the furrow and allows the tractor to run on all four wheels practically on a level when at work.

Having now fully described my invention, what I claim and desire to protect by Letters Patent is:

1. In a tractor for use in plowing, in combination with the front axle and wheels, means to have one of the guiding wheels run in a line outside of the regular wheel base and at a lower level than the other wheels, said means comprising an extension piece with its outer end formed to receive the wheel steering knuckle and its inner end adapted to clamp the axle and bored intermediately to receive a bolt dropped through the king-pin hole of the axle for firmly securing the extension piece beneath said axle.

2. In a tractor for use in plowing, in combination with the front axle and wheels, an extension for the axle adapted to bear a knuckle for a wheel at its end outside of and below the level of the other wheels, said extension comprising a unitary member orificed intermediate its ends for the reception of a bolt and at its inner end provided with ears on either side, said ears being at different distances from said orifice, whereby the extension may be applied to the axle at an angle, an ear on each side thereof, and then turned until the orifice is in line with the king-pin hole of the axle, in which position the ears clamp the axle and hold the extension rigidly thereto.

In testimony of which invention, I have hereunto set my hand, at Middletown, on this second day of June, 1921.

JAMES W. BROCKSON.

Witness:
DANIEL W. STEVENS.